(12) United States Patent
Thoraval

(10) Patent No.: US 6,464,881 B2
(45) Date of Patent: Oct. 15, 2002

(54) INORGANIC NANOFILTRATION MEMBRANE AND ITS APPLICATION IN THE SUGAR INDUSTRY

(75) Inventor: Valérie Thoraval, Morance (FR)

(73) Assignee: Orelis, Saint-Maurice de Beynost (FR)

( * ) Notice: Subject to any disclaimer, the term of this patent is extended or adjusted under 35 U.S.C. 154(b) by 23 days.

(21) Appl. No.: 09/739,986

(22) Filed: Dec. 19, 2000

(65) Prior Publication Data

US 2001/0001453 A1 May 24, 2001

Related U.S. Application Data

(63) Continuation of application No. 09/284,791, filed as application No. PCT/FR97/01861 on Oct. 17, 1997, now abandoned.

(30) Foreign Application Priority Data

Oct. 21, 1996 (FR) ............................. 96 12734

(51) Int. Cl.⁷ .............................. B01D 61/00
(52) U.S. Cl. ................... 210/652; 210/651; 210/490; 210/500.25
(58) Field of Search ................ 210/490, 651, 210/652, 500.25, 500.26

(56) References Cited

U.S. PATENT DOCUMENTS

| | | | |
|---|---|---|---|
| 5,104,539 A | 4/1992 | Anderson | 210/510.25 |
| 5,137,634 A | 8/1992 | Butler | 210/490 |
| 5,250,184 A | 10/1993 | Maier | 210/653 |
| 5,269,926 A | 12/1993 | Webster | 210/500.25 |
| 5,415,775 A | 5/1995 | Castillon | 210/490 |
| 5,997,744 A | * 12/1999 | Limaye | |
| 6,096,136 A | * 8/2000 | Sasha | |

FOREIGN PATENT DOCUMENTS

| | | | |
|---|---|---|---|
| EP | A-0585152 | * | 3/1994 |

OTHER PUBLICATIONS

A. Julbe et al., Journal of Membrane Science, 77 (1993) pp. 137–153, XP000387932.

International Search Report.

* cited by examiner

*Primary Examiner*—Ana Fortuna

(57) ABSTRACT

The invention concerns an inorganic nanofiltration membrane with a detachment threshold between 100 and 200 daltons and comprising: a multichannel ceramic monolith support consisting of a mixture of $Al_2O_3$ and of $TiO_2$, a microfiltration membrane separating layer, an ultrafiltration membrane separating layer, preferably consisting of $ZrO_2$, a nanofiltration membrane separating layer, preferably consisting of $ZrO_2$, and obtained by a sol-gel type method. This inorganic nanofiltration membrane is designed for use in the sugar industry, more particularly for treating saline effluents derived from the regeneration of ion exchanging resins used if the refining of cane sugar.

10 Claims, No Drawings

INORGANIC NANOFILTRATION MEMBRANE AND ITS APPLICATION IN THE SUGAR INDUSTRY

This application is a continuation application under 35 U.S.C. Section 371 of application Ser. No.: 09/284,791, filed on Aug. 16, 1999, now abandoned which is a 371 of PCT/FR97/01861 filed Oct. 17, 1997.

The present invention relates to an inorganic nanofiltration membrane which can be used especially in the sugar industry, in particular in the refining of cane sugar.

Membranes have been known for many years for their separation properties and are rapidly expanding with respect to conventional separative techniques in many fields of activity, in particular the farm-produce industry, biotechnology, the chemical, pharmaceutical and nuclear industries and the environment, in particular the treatment of drinking water and industrial effluents.

This transfer in technology towards membrane separative techniques has appeared in a rather marked way in the fields of tangential microfiltration (mean diameter of the pores of the membrane of between 0.1 and 5 $\mu$m) and of tangential ultrafiltration (mean diameter of the pores of the membrane of between 2 and 150 nm).

In tangential filtration techniques, the fluid to be treated moves parallel to the membrane.

The first membranes used were organic membranes which, in the fields of microfiltration and of ultrafiltration, are increasingly being replaced by inorganic membranes; the latter generally exhibit better mechanical strength and better chemical, biological and thermal stability.

Nanofiltration membranes which most often operate under tangential flow (mean diameter of the pores of the membrane of between 0.5 and 2 nm, generally of the order of 1 nm), in particular for the separation of organic compounds and of multivalent ions contained in water or effluents, have recently been developed. However, these membranes are still organic or mixed organic/inorganic membranes, the mechanical strength and the chemical, biological and thermal inertia of which are not as satisfactory as those which would be desired, which may not always operate efficiently under extreme conditions of use (pH, temperature, pressure, and the like).

In the same way, the use is known in the process for refining cane sugar of an operation for the purification of the sugar, in general in two stages, in order to decolour it and to remove certain organic impurities, such as polysaccharides.

The colouring is mainly due to the decomposition of glucose and fructose at temperatures not greatly exceeding 100° C.

The first purification stage (or decolouring stage), which most often comprises a carbonatation or a phosphatation, is often followed by a second purification stage (or decolouring stage) in which the sugar liquor passes, generally at a temperature of 80 to 90° C. (in order to reduce its viscosity), into one or a number of ion-exchange resins. The colorants and other impurities contained in the sugar liquor are then adsorbed on the resin (the goal is often for almost 90% of these colorants to thus be removed).

After a certain period of time, it proves necessary to regenerate the laden resin. Desorption of the colorants (and other impurities) is then carried out by using a brine or basic sodium chloride solution (pH generally of the order of 12), at a temperature usually of between 80 and 90° C.

The saline effluent resulting from the regeneration of the ion-exchange resins contains essentially sodium chloride but also organic matter (colorants and other impurities).

The Applicant Company has developed, with the aim in particular of recovering this saline effluent, a new filtration membrane, in this case a specific inorganic nanofiltration membrane.

This membrane, which meets the requirements of thermal and chemical resistance which follow from the conditions of use of a process for refining cane sugar, makes possible efficient separation of the organic matter (colorants and other impurities) from the saline effluent, which is thus regenerated and can subsequently be reused for the desorption of the colorants (and other impurities) adsorbed on the resins.

The use of this membrane thus makes possible efficient recycling of the saline effluent resulting from the regeneration of the ion-exchange resins and thus a significant reduction in the amounts of sodium chloride and of water necessary for the manufacture of the solutions for the regeneration of the resins.

In addition to its thermal and chemical resistance, the membrane according to the invention exhibits very good mechanical strength and thus a very long lifetime of use.

Thus, one of the subjects of the invention is an inorganic nanofiltration membrane containing:

- a multichannel monolithic ceramic support composed of a mixture of $Al_2O_3$ and of $TiO_2$ and exhibiting a mean equivalent pore diameter Ds of between 1 and 20 $\mu$m, preferably between 5 and 15 $\mu$m,
- a microfiltration membrane separating layer situated at the surface of the channels and composed of sintered particles of metal oxide(s), the mean equivalent pore diameter Do of which before sintering is between 0.1 and 3.0 $\mu$m, according to a Ds/Do ratio such that 0.3<Ds/Do<200, preferably 1<Ds/Do<150, the said microfiltration membrane layer exhibiting a mean equivalent pore diameter Dm of between 0.05 and 1.5 $\mu$m,
- an ultrafiltration membrane separating layer situated on the said microfiltration membrane layer and composed of sintered particles of metal oxide(s), the mean equivalent pore diameter Du of which before sintering is between 2 and 100 nm, according to a Dm/Du ratio such that 0.5<Dm/Du<750,
- a nanofiltration membrane separating layer situated on the said ultrafiltration membrane layer and composed of sintered particles of metal oxide(s), the mean equivalent pore diameter Dn of which before sintering is between 0.5 and 1.5 nm, the said inorganic nanofiltration membrane exhibiting a cutoff threshold of between 100 and 2000 daltons.

The monolithic support advantageously exhibits a high porosity, generally greater than 30% and preferably greater than 40% (measured using a mercury porosimeter).

It is preferentially composed of a ceramic of $Al_2O_3$ grains coated at least in part with $TiO_2$ grains, the $TiO_2/(Al_2O_3+TiO_2)$ ratio by weight being between 1 and 75%, in particular between 20 and 50%, for example between 20 and 40%.

The $Al_2O_3$ grains generally exhibit a mean particle size of between 3 and 500 $\mu$m, preferably between 10 and 100 $\mu$m and more preferentially still between 20 and 30 $\mu$m. The $TiO_2$ grains usually exhibit a mean particle size of between 0.01 and 7 $\mu$m, preferably between 0.1 and 1 $\mu$m.

Generally, the alumina is essentially of corundum type (it being possible for the grains to have a tabular shape) and the titanium oxide is essentially of rutile type.

The monolithic support is preferably prepared by the process described in Patent Application EP-A-0,585,152 (column 3, line 24 to column 4, line 11).

The monolithic support is generally described as macroporous.

This support can exhibit a diameter of between 15 and 30 mm, for example 20 mm, and a length of between 800 and 1300 mm, for example of the order of 860 mm.

The number of channels in the monolithic support is generally between 5 and 52, in particular 7 or 19. Their diameter can in particular lie between 1.5 and 7 mm, in particular between 2.5 and 4.5 mm.

A particularly advantageous support consists of a monolithic support employed in the Kerasep® membranes sold by the Applicant Company.

The metals of the metal oxides forming the various membrane separating layers can be, for example, chosen from beryllium, magnesium, calcium, aluminium, titanium, strontium, yttrium, lanthanum, zirconium, hafnium, thorium, iron, manganese, silicon and their various possible mixtures.

However, the metal oxide(s) of the microfiltration membrane layer is (are) generally alumina, zirconia or, preferably, titanium oxide.

The microfiltration membrane layer is usually deposited on the support by the known process called slip casting, according to which generally a slip of the metal oxide is deposited on the support and then an appropriate sintering is carried out. The sintered membrane layer preferably has a thickness of between 5 and 50 $\mu$m.

The sintering temperature must be compatible with the maximum sintering temperature of the support. Thus, when the support is made of corundum and rutile, use is preferably made of a membrane layer based on titanium oxide, the sintering temperature of which is less than 1275° C.

In a highly preferred way, the microfiltration membrane layer must not substantially penetrate inside the support. The interpenetration of this membrane layer is thus generally less than 2 $\mu$m, in particular less than 0.5 $\mu$m.

For this, it is possible, before the slip casting, to fill in the porosity of the support with an organic binder which decomposes at the time of sintering, such as, for example, a melamine/formaldehyde resin; it is also possible to block the orifices of the pores of the support by means of very fine powders of products which are removed by combustion in air, such as, for example, carbon black.

The metal oxide(s) of the ultrafiltration membrane layer can in particular be titanium oxide or, preferably, zirconia.

The sintered particles of metal oxides are in this instance generally obtained:

either with an oxide and a process for depositing the layer analogous to those employed for the microfiltration membrane layer (only the particle size changes), or by heat treatment of hydrated particles of oxides obtained by a process of sol-gel type, which particles are deposited by the slip casting method.

The porosity of the ultrafiltration membrane layer must be suited to receiving the nanofiltration membrane layer: the ultrafiltration membrane layer thus exhibits a mean pore diameter of between 2 and 100 nm, preferably between 2 and 50 nm.

In a highly preferred way, the ultrafiltration membrane layer must not substantially penetrate inside the microfiltration membrane layer.

When the ultrafiltration membrane layer is zirconia, the said layer exhibits a cutoff threshold between 10 and 300 kD (1 kD=$10^3$ daltons), for example 15 kD.

It should be noted that the monolithic support+ microfiltration membrane layer+ultrafiltration membrane layer combination forms an ultrafiltration membrane as illustrated in Patent Application EP-A-0,585,152.

The metal oxide of the ultrafiltration membrane layer is preferably zirconia.

The nanofiltration membrane layer is advantageously obtained by a process of sol-gel type preferably comprising a hydrolysis in alcoholic medium, for example in propanol.

According to a preferred embodiment of the invention, the nanofiltration membrane layer is a zirconia layer obtained by a process of sol-gel type comprising:

the formation of a sol by hydrolysis in alcoholic medium, for example in propanol, of a zirconium alkoxide precursor, preferably in the presence of a complexing ligand which makes it possible to control the hydrolysis, in accordance with what is described in Patent Application EP-A-0,627,960; it is possible, for example, to form such a sol by hydrolysing zirconium propoxide ($Zr(OC_3H_7)_4$) in propanol in the presence of the complexing ligand acetylacetone;

the deposition of the sol on the ultrafiltration membrane layer; this deposition is preferably obtained by bringing the ultrafiltration membrane layer (thus the ultrafiltration membrane) and the sol prepared above into contact by filling the channels, to which sol will have been added beforehand an organic binder, for example poly(vinyl alcohol), in order to adjust the viscosity;

the conversion of the sol into a gel by drying;

finally, a heat treatment, which makes it possible to convert the gel layer into a metal oxide (zirconia) layer.

Operating conditions for the preparation of a sol (alkoxide content, complexing ligand content) and/or the drying and heat treatment (temperature) conditions are preferably chosen so as to obtain a membrane known as a microporous membrane (mean pore diameter generally of the order of 1 nm); then the drying temperature can be between 40 and 100° C.; the heat treatment temperature is in particular between 350 and 600° C.

The use of a process of sol-gel type, as described above, at least in part conditions the characteristics of the final membrane, in particular its selectivity and its permeability to water.

By way of indication, the membrane according to the invention has a flow of permeate containing water which can reach at least 100 l/h.m² at a transmembrane pressure of 5 bars, with a degree of retention of sucrose which can be between 35 and 60% and a degree of retention of vitamin B12 between 60 and 85%; the thickness of the nanofiltration membrane layer is preferably between 0.05 and 1 $\mu$m.

Moreover, the membrane according to the invention in particular exhibits a high thermal and chemical stability (stable up to at least 250° C. and stable at a pH of between 0 and 14).

As emphasized above, the inorganic membrane according to the invention finds a particularly advantageous application in the cane sugar industry.

It can thus be efficiently used in a process for refining cane sugar, in particular in the treatment of the saline effluents resulting from the regeneration of the ion-exchange resins employed in the refining of cane sugar.

A nanofiltration using this membrane could in addition replace, in the process for refining cane sugar, one and/or the other stage of decolouring the sugar liquor; in fact, the degree of decolouring generally required (approximately 90%) can be achieved, indeed even exceeded, by the use of this membrane.

The following example illustrates the invention without, however, limiting the scope thereof.

EXAMPLE

Use is made, for the treatment of a saline effluent resulting from the regeneration of the ion-exchange resins employed in a process for refining cane sugar, of a module (of approximately 1 m²) containing 9 inorganic nanofiltration membranes according to the invention; the nanofiltration membrane layer of each of these 9 membranes is a zirconia layer obtained by a process of sol-gel type in accordance with the preferred embodiment of the invention as described above (drying temperature: 80° C.; heat treatment temperature: 400° C.), deposited on a Kerasep® ultrafiltration membrane having a cutoff threshold of 15 kD, the support ($Al_2O_3/TiO_2$ monolith, with a $TiO_2/(Al_2O_3+TiO_2)$ ratio by weight of 25%,) having a diameter of 20 mm and a length of 856 mm and containing 19 channels; in each of the 9 membranes, the microfiltration membrane layer is made up of titanium oxide and the ultrafiltration membrane layer is made up of zirconia.

With regard to each of 9 membranes, the mean equivalent pore diameters are: $D_s$:6 μm; $D_o$:0.2 μm; $D_m$:0.1 μm; $D_u$:7 nm; $D_n$:1 nm. The cutoff threshold of each of them is 1000 daltons.

The operating conditions are as follows:

Closed loop for optimization

Temperature of 70° C.

Pressure of 10 to 15 bars

Circulation rate of 2 to 5 m/s

Volume concentration factor (VCF) of 5 to 8

Stable permeate flow after 8 hours.

The results below are obtained:

| | |
|---|---|
| NaCl recovered | 97% |
| Colour retention | 90% |
| Throughput | 80–140 l/m²/h |
| Volume recovered | >85% |
| Retention of the impurities | >90% |

What is claimed is:

1. An inorganic nanofiltration membrane comprising:

a multichannel monolithic ceramic support consisting essentially of a mixture of Al2O3 and of TiO2 and exhibiting a mean equivalent pore diameter $D_s$ of between 1 and 20 μm, a microfiltration membrane separating layer situated at the surface of the channels and consisting essentially of sintered particles of metal oxide(s), whose mean equivalent pore diameter $D_o$ before sintering is between 0.1 and 3.0 μm, according to a $D_s/D_o$ ratio such that $0.3<D_s/D_o<200$, the said microfiltration membrane layer exhibiting a mean equivalent pore diameter $D_m$ of between 0.05 and 1.5 μm, an ultrafiltration membrane separating layer situated on said microfiltration membrane layer and consisting essentially of sintered particles of metal oxide(s), whose mean equivalent pore diameter $D_u$ before sintering is between 2 and 100 nm, according to a $D_m/D_u$ ratio such that $0.5<D_m/D_u<750$, and a nanofiltration membrane separating layer situated on said ultrafiltration membrane layer and composed of sintered particles of metal oxide(s), whose mean equivalent pore diameter $D_n$ before sintering is between 0.5 and 1.5 nm, said inorganic nanofiltration membrane exhibiting a cutoff threshold of between 100 and 2000 daltons.

2. A membrane according to claim 1, wherein said monolithic support exhibits a porosity greater than 30%.

3. A membrane according to claim 1, wherein said monolithic support is a ceramic of Al2O3 grains coated at least in part with TiO2 grains, and having a TiO2/(Al2O3+TiO2) ratio by weight between 1 and 75%.

4. A membrane according to claim 1, wherein the metal oxide(s) of the microfiltration membrane layer is (are) alumina, zirconia or titanium oxide.

5. A membrane according to claim 1, wherein the metal oxide(s) of the ultrafiltration membrane layer is (are) titanium oxide or zirconia.

6. A membrane according to claim 5, wherein the metal oxide of the ultrafiltration membrane layer is zirconia, said layer exhibiting a cutoff threshold of between 10 and 300 kD.

7. A membrane according to claim 1, wherein the nanofiltration membrane layer is zirconia.

8. A membrane according to claim 1, wherein the nanofiltration membrane layer is made by the sol-gel process comprising a hydrolysis in an alcoholic medium.

9. A membrane according to claim 8, wherein the nanofiltration membrane layer is a zirconia layer made by the sol-gel process of:

a) preparing a sol by hydrolysis in an alcoholic medium of a zirconium alkoxide precursor, in the presence of a complexing ligand;

b) depositing the sol on the ultrafiltration membrane layer, by bringing the ultrafiltration membrane layer and the sol obtained in above step a), into contact by filling the channels, to which sol has been added beforehand an organic binder;

c) converting the sol into a gel by drying; and d) carrying out a heat treatment on the gel prepared in step c) to obtain the nanofiltration membrane layer.

10. A process for the treatment of saline effluents resulting from the regeneration of the ion-exchange resins employed in the refining of cane sugar comprising the step of filtering said effluents with a membrane as defined in claim 1.

* * * * *